Sept. 13, 1927.  M. BUCHLER  1,642,538
VALVE GEAR
Filed Jan. 31, 1923  2 Sheets-Sheet 2
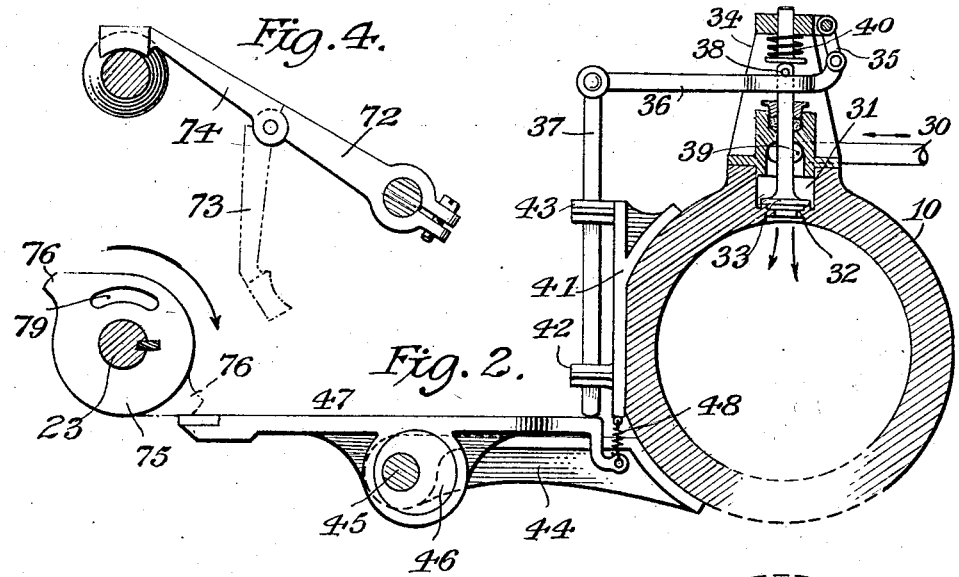
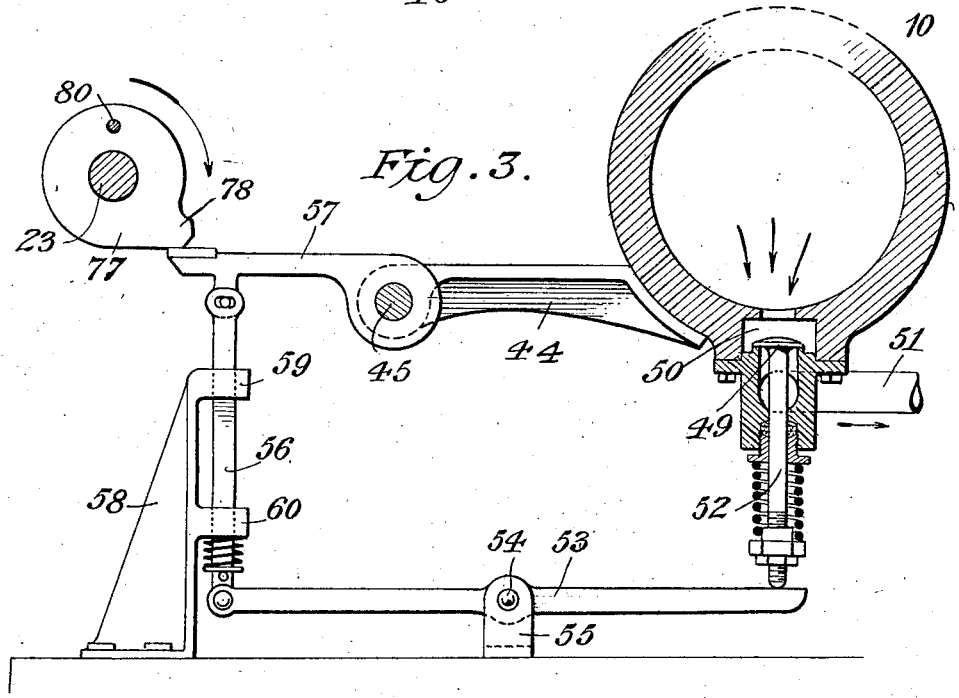

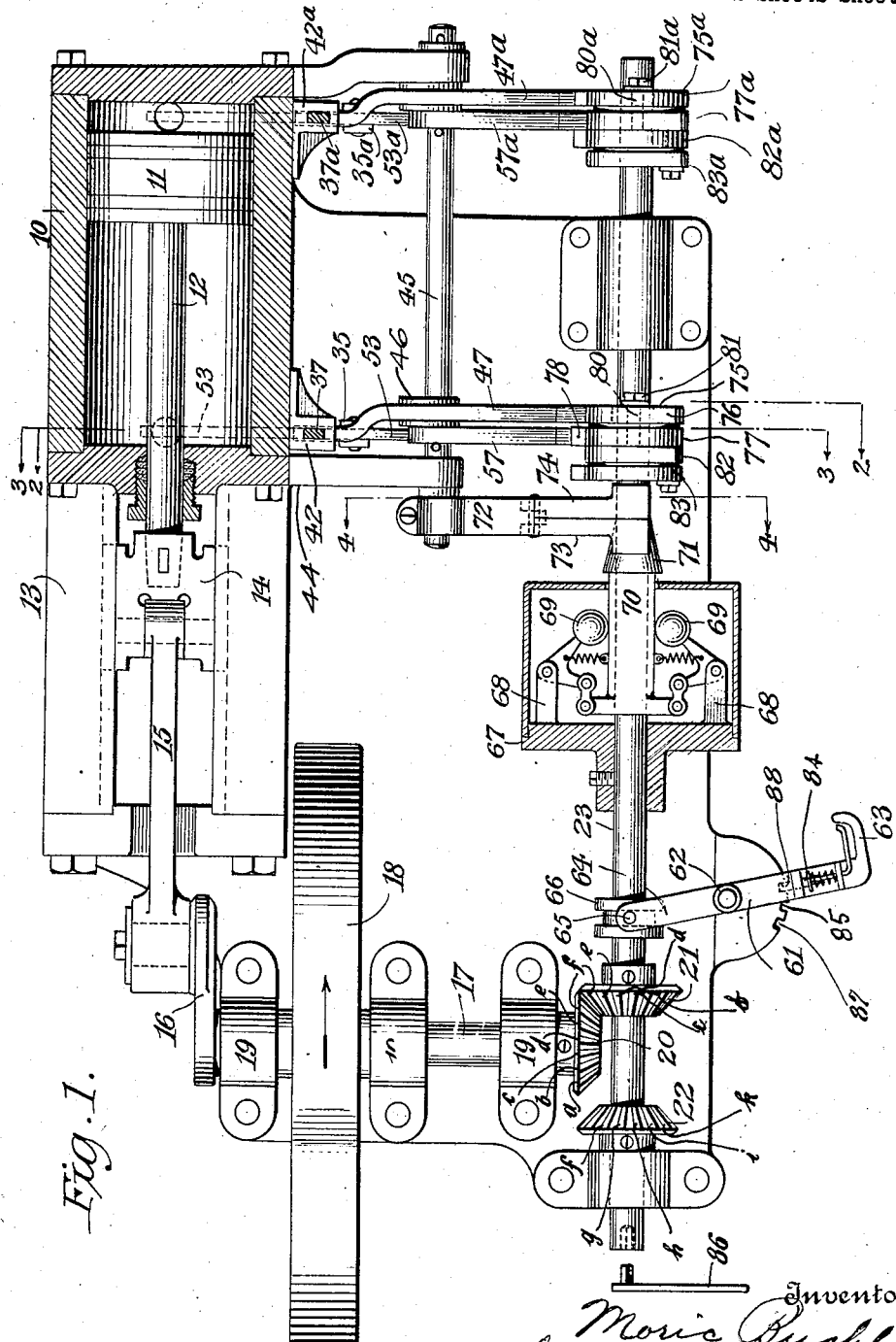

Patented Sept. 13, 1927.

1,642,538

UNITED STATES PATENT OFFICE.

MORIC BUCHLER, OF BUDAPEST, HUNGARY.

VALVE GEAR.

Application filed January 31, 1923. Serial No. 616,029.

The invention which constitutes the subject matter of this application relates to improvements in valve gears capable of use not only with compressed air and steam engines, but with gas engines as well. For the purpose of illustrating the principles, construction and mode of operation of the invention I have illustrated the same as applied to a steam engine having a single cylinder.

More specifically the invention has to do with improvements in valve gears in which a gear shaft is employed having a governor thereon for controlling the admission of motive fluid to the engine said controlling means acting through the intermediary of a regulator shaft, upon the inlet valve or valves of the engine. Furthermore the number of connecting parts are reduced to the minimum and all of the parts are of the simplest construction.

Figure 1 is a top plan view of the invention, certain parts being in section to illustrate the construction thereof;

Figure 2 is a section taken on the line 2—2 of Figure 1;

Figure 3 is a section taken on the line 3—3 of Figure 1;

Figure 4 illustrates a detail taken on the line 4—4 of Figure 1.

Referring to the drawing in detail, the reference numeral 10 designates a steam cylinder provided with a piston 11, a piston rod 12, guides 13 and a cross-head 14 connected to the piston rod 12. To the crosshead 14 is pivotally connected one end of the link 15, the other end of the link being pivoted to the crank arm 16, the latter being rigidly mounted upon and adapted to rotate the shaft 17 upon which the fly wheel 18 is rigidly secured. The shaft 17 is provided with a plurality of bearings 19. The end of the shaft 17, opposite to the end on which the crank arm 16 is mounted, is provided with a beveled gear 20 which is adapted to mesh with the beveled gears 21 and 22 located upon the gear shaft 23. This shaft 23 is not only rotatable about its longitudinal axis, but is capable of being moved longitudinally, as will more fully hereinafter appear, to bring said beveled gears 21 and 22 in mesh with beveled gear 20 to run the engine forward or backward, as the case may be. It will be noted, in this connection, that the engine illustrated herein is of that type which may be run forwardly or backwardly.

The front of the engine cylinder 10 is provided with a motive fluid inlet pipe 30, see Figure 2, controlled by a suitable throttle, not shown in the drawing. This pipe 30 discharges into an inlet chamber 31 and connecting the interior of the cylinder 10 with said chamber 31 is an inlet port 32 controlled by a spring pressed valve 33 the latter for the purposes of illustration, being of the poppet type. For the purpose of raising this valve at a predetermined point in the travel of the piston 11, I employ the following mechanism. The cylinder 10 is equipped with a bracket member 34 (see Figure 2) to which is pivotally connected a link 35. One end of the link 36 is pivoted to the link 35, the other end of the link 36 being pivotally connected with a longitudinally reciprocating arm 37. The upper surface of the link 36 engages with pins 38 projecting from the stem 39 of the valve 33 so that when the arm 37 is moved upwardly the valve 33 will be opened against the tension of the spring 40 to admit steam in front of the piston 11 in the cylinder 10. Preferably fixed to the engine cylinder 10 is a bracket member 41 provided with guides 42 and 43 in which the arm 37 is adapted to be reciprocated as will be clearly apparent from an inspection of Fig. 2. Mounted upon the arms 44 is a regulator shaft 45 provided with an eccentric disk 46 keyed thereto. Upon this eccentric 46 is pivotally mounted a lever 47, one end of which engages with the lower end of the arm 37 to actuate the latter, a spring 48 attached to said lever 47 and to the bracket 41 being employed to maintain one end of the lever 45 normally in contact with the lower end of the arm 37. The mechanism for actuating the lever 47 and thereby the arm 37 to open and close the inlet port will be described in detail later.

Located adjacent the mechanism just described for admitting motive fluid to one end of the cylinder is mechanism for controlling the exhaust from the same end of the engine. This mechanism comprises a spring pressed exhaust valve 49 which establishes a connection between a chamber 50 and exhaust pipe 51. The stem 52 of the valve 49 abuts against one end of the arm 53, pivoted at 54 to a suitable bracket 55. The other end of the arm 53 is pivotally connected to a longitudinally movable spring pressed arm 56, the other end of the arm 56 being pivoted to the eccentrically movable arm 57 pivotally mounted upon the regulator shaft 45. Suitably mounted upon the engine base is a bracket 58 provided with guides 59 and 60 in which the arm or rod 56 is adapted to be reciprocated as will be clearly apparent from an inspection of Figure 3.

The mechanism just described controls the inlet of the motive fluid to and the exhaust of the gases from one end of the cylinder 10, that is from the chamber in front of the piston 11. Corresponding mechanism is provided at the opposite end of the cylinder for controlling the admission of motive fluid to and the discharge of the exhaust gases from behind the piston 11, the corresponding parts being designated by the same reference numerals with the letter *a* attached thereto. The mechanism for actuating the levers 47 and 57 for controlling the inlet of the motive fluid to and the exhaust of the gases from the chamber in front of the piston will now be described.

As before stated, the gear shaft 23 is not only rotatably mounted, but is movable about its longitudinal axis to bring the beveled gears 21 and 22 alternately into mesh with the beveled gear 20 in running the engine backwardly or forwardly, as the case may be. For accomplishing this I employ a suitable lever 61, pivoted at 62, one end of which is provided with a handle member 63 and the other end of which is provided with a fork or yoke 64 having the pins 65 therein (only one being shown) adapted to be engaged with the groove member 66 fixed upon said shaft 23. Also mounted upon the shaft 23 is a governor comprising a housing 67 suitably fixed to the shaft 23 and provided with two arms 68 upon which the governor balls 69 are pivotally mounted, the latter being so connected with a sleeve member 70 as to move the latter longitudinally of said shaft 23. The sleeve member 70 is provided with a conical cam member 71 which is adapted to oscillate the regulator shaft 45 through the intermediary of the arm 72 and the levers 73 and 74 connected to arm 72 by means of knuckle joints as clearly illustrated in Figures 1 and 4. Fixed upon said shaft 23 is a disk member 75 provided with a projection 76 (see Figure 3) adapted to engage with one end of the lever 47 to actuate the same upon each complete rotation thereof to open and close the inlet port of the cylinder in front of the piston 11. Located adjacent to the disk 75 is a second disk 77 provided with a projection 78 (see Fig. 3) adapted to engage with the lever 57 to open and close the exhaust port in the same end of the cylinder. The disk 75 is keyed to the gear shaft 23 and is provided with an arcuate slot 79 through which the bolt 80, fixed to the disk 75, is adapted to pass. By means of the said slot 79, bolt 80 and nut 81, the disks 75 and 77 are not only relatively adjustable, but when properly adjusted can be rigidly secured to each other for practical operation. It will be noted that the projections 76 and 78 are located at substantially diametrically opposite positions with respect to each other so as to effect the opening and closing of the inlet and exhaust ports at the proper predetermined points of travel of the piston 11. As above stated, the levers 47 and 57 control the inlet and exhaust ports at one end of the cylinder. Corresponding levers $47^a$ and $57^a$ are provided (see Figure 1) for controlling the inlet and exhaust ports at the opposite end of the cylinder, said lever $47^a$ and $57^a$ being controlled respectively by means of the disks $75^a$ and $77^a$. The bolt $80^a$ and nut $81^a$ corresponding to bolt 80 and nut 81 are employed for maintaining the disk $77^a$ in proper position with respect to the disk $75^a$. As illustrated in Figure 1 of the drawings, the parts are shown in the position for running the engine backward. When it is desired to run the engine in the opposite direction the lever 60 is actuated to move the gear shaft 23 to the right, thus bringing the beveled gear 22 in mesh with the beveled gear 20. At the same time the disks 82 and 83 are brought into a position to engage the levers 47 and 57 and the disks $82^a$ and $83^a$ are brought into a position to engage with the levers $47^a$ and $57^a$. At the same time the conical portion 71 of the sleeve 70 is moved to the right to engage with the arm 74 for controlling the quantity of motive fluid admitted to the cylinder 10. It will thus be seen that the shifting of the gear shaft 23 to the forward movement causes the disks 82, 83, $82^a$ and $83^a$ to occupy the same position as were occupied by the disks 75, 77, $75^a$ and $77^a$ in running the engine backwardly. The construction and relative arrangements of the disks 82, 83, $82^a$ and $83^a$ is the same as disks 75, 77, $75^a$ and $77^a$.

The operation of the device may be briefly summarized as follows: In the position of the parts illustrated in Figure 1 the engine will run backwards, that is to say the fly wheel 18 will be rotated in the direction indicated by the arrow thereon. The rotation of the shaft 17 imparts a rotational movement to the shaft 23 and consequently the disks 75, 77 in the direction indicated by the arrows on Figures 2 and 3. The rotation of the shaft 23 tends to deflect the governor balls 69 outwardly thereby imparting a corresponding movement to the sleeve 70 depending upon the speed of said shaft 23; that is the speed of the engine. The movement of the sleeve 70 causes the conical cam member 71 thereon to raise the lever 73, thereby rotating the regulator shaft 45 and its eccentric 46, the latter enabling the lever 47 to be correspondingly lowered, thus diminishing the extent of movement of the lever 47 by the engagement with it of the projection 76 on cam 75, thus also diminishing the extent to which the inlet port is opened, as will be understood. At the proper moment the projection 78 on the cam disk 77 will engage with and actuate the arm 57 to open the exhaust port as previously described.

When the lever 61 is actuated to reverse the engine to run the same forwards the bevel gear 22 is brought into mesh with bevel gear 20 by the longitudinal movement of the shaft 23. The arm 72 is raised to permit the arm 73 to drop out of the way (see Figure 4), the arm 74 now functioning in lieu of arm 73. If the arm 73 were not moved out of the way it would ride upon the high portion of the cam 80 and defeat the controlling feature of my invention. It will be noted that the shaft 23 is moved a distance to bring the conical camming member 71 into operative relationship to the arm 74. It will of course be understood that other means than the arms 72, 73 and 74 may be employed for actuating the shaft 45, the means herein shown being for illustration only. When the shaft 23 is moved to the right this brings the cam disks 82, 83, 82ª and 83ª, as previously stated, in the position previously occupied by disks 75, 77, 75ª and 77ª, thereby enabling the levers 45, 57, 45ª and 57ª to be actuated by said disks 82, 83, 82ª and 83ª, it being understood that the disks last mentioned are so positioned on the shaft 23 as to admit the motive fluid and discharge of the exhaust gases to run the engine forward.

It will be understood that in reversing the direction of the engine the latter must be stopped. The gears 21 and 22 are then brought into neutral position by shifting the lever 61 so as to cause the spring-pressed latching member 84 to engage the notch 85. Thereafter the shaft is rotated by the spanner 86 until a certain designated tooth on gear 22 is in position to register with the correspondingly designated space between successive teeth on the gear 20. The gears 20 and 22 are then brought into mesh by a continuation of the movement of the lever 61, that is by causing the latching member 84 to engage with the notch 87. To reverse the direction of the engine, the gears 21 and 22 are again moved to neutral position and the shaft 23 rotated by the spanner 86 until a certain designated space between successive teeth on the gear 20 is in position to register with the correspondingly designated tooth on gear 21. The gears 20 and 21 are then brought into proper enmeshment by a movement of the lever 61 as will cause the latching member 84 to engage with the notch 88. On Fig. 1 I have designated the teeth on gears 21 and 22 by reference letters, and the spaces between the teeth on gear 20 by corresponding letters. Other designations may be employed. These designations may be placed at any convenient points upon the gears.

From the foregoing it will be seen that I have devised a simple, efficient and economical form of valve gear. I have illustrated and described herein one embodiment of my invention, but it is to be expressly understood that I do not limit myself thereto as many changes may be made in points of detail and indeed other embodiments resorted to without deviating from the true spirit and scope of my invention.

What I claim is:

1. An engine comprising a cylinder having inlet and exhaust valves at each end thereof, a piston movable in said cylinder under the pressure of fluid on either side thereof, a crankshaft driven by said piston, a valve shaft driven from said crankshaft always in the same direction, a set of cams mounted on said shaft and actuated thereby for operating said valves, speed governing means, a conical sleeve on said shaft laterally shiftable by said governor, a regulator shaft, a hinged arm mounted on said regulator shaft and operated by and adapted to rest on said sleeve, lever arms fulcrumed on said regulator shaft and actuated by said cams for operating said valves, and means operable by rotation of said regulator shaft to move the fulcrum point of said lever arms to vary said valve timing.

2. An engine comprising a cylinder having inlet and exhaust valves at each end thereof, a piston movable in said cylinder under the pressure of fluid on either side thereof, a crankshaft driven by said piston, a valve shaft driven from said crankshaft always in the same direction, a set of cams mounted on said shaft and actuated thereby for operating said valves to run said engine in one direction, a second set of cams mounted adjacent to said first set and actuated by said valve shaft for operating said valves to run said engine in the other direction and said shaft being longitudinally shiftable to determine the direction of engine operation, speed governing means, a conical sleeve on said shaft laterally shiftable by said governor, a regulator shaft, a pair of hinged arms mounted on said regulator shaft and operated by and adapted to rest selectively on said sleeve in accordance with the direction of operation of said engine, lever arms fulcrumed on said regulator shaft and actuated by said cams for operating said valves, and means operable by rotation of said regulator shaft to move the fulcrum point of said lever arms to vary said valve timing.

In testimony whereof, I have hereunto set my hand and affixed my seal this 20 day of October 1922.

MORIC BUCHLER.